United States Patent
Schieman et al.

(10) Patent No.: US 11,743,203 B2
(45) Date of Patent: Aug. 29, 2023

(54) MANAGING RESOURCE ACCESS

(71) Applicant: BlackBerry Limited, Waterloo (CA)

(72) Inventors: Adam Richard Schieman, Toronto (CA); Katherine Evelyn Kalles, Waterloo (CA); Daniel Jonas Major, Ottawa (CA); Michael George Langlois, Almonte (CA)

(73) Assignee: BlackBerry Limited, Waterloo (CA)

( * ) Notice: Subject to any disclaimer, the term of this patent is extended or adjusted under 35 U.S.C. 154(b) by 182 days.

(21) Appl. No.: 15/435,022

(22) Filed: Feb. 16, 2017

(65) Prior Publication Data

US 2017/0235469 A1 Aug. 17, 2017

Related U.S. Application Data

(60) Provisional application No. 62/296,414, filed on Feb. 17, 2016.

(51) Int. Cl.
| | |
|---|---|
| *H04L 47/70* | (2022.01) |
| *H04L 41/22* | (2022.01) |
| *G06F 9/46* | (2006.01) |
| *G06F 3/04847* | (2022.01) |
| *G06F 3/04842* | (2022.01) |

(52) U.S. Cl.
CPC .......... *H04L 47/70* (2013.01); *G06F 3/04842* (2013.01); *G06F 3/04847* (2013.01); *G06F 9/468* (2013.01); *H04L 41/22* (2013.01)

(58) Field of Classification Search
CPC .................................................. G06F 3/04847
USPC ....................................................... 715/738
See application file for complete search history.

(56) References Cited

U.S. PATENT DOCUMENTS

| | | | | |
|---|---|---|---|---|
| 5,412,400 | A * | 5/1995 | Takahara | G05B 23/0272 715/788 |
| 9,152,694 | B1 * | 10/2015 | Padidar | G06F 17/30598 |
| 9,407,521 | B1 * | 8/2016 | Kulkarni | H04L 43/08 |
| 9,495,270 | B2 * | 11/2016 | Wong | G06F 11/328 |
| 9,984,520 | B1 * | 5/2018 | Heller | H04W 4/80 |
| 2002/0069320 | A1 * | 6/2002 | Yagi | G06F 3/0613 711/112 |
| 2004/0239700 | A1 * | 12/2004 | Baschy | G06F 21/62 715/781 |
| 2009/0327962 | A1 * | 12/2009 | Betts-LaCroix | G06F 9/5011 715/833 |

(Continued)

OTHER PUBLICATIONS

Hoffman, Chris, How to Manage App Permissions on Your iPhone or iPad, How-To Geek, LLC, available at https://www.howtogeek.com/211623/how-to-manage-app-permissions-on-your-iphone-or-ipad/ (Mar. 14, 2015) (Year: 2015).*

(Continued)

*Primary Examiner* — Mohamed Abou El Seoud
*Assistant Examiner* — Conrad R Pack
(74) *Attorney, Agent, or Firm* — Fish & Richardson P.C.

(57) ABSTRACT

Systems, methods, and software can be used to manage resource access. In some aspect, a user interface is outputted on an electronic device. The user interface includes information for resource access and a user interface object for controlling a resource access permission. A user input associated with the user interface object is received. In response to receiving the user input, the resource access permission is changed.

11 Claims, 4 Drawing Sheets

(56) References Cited

U.S. PATENT DOCUMENTS

| | | | | |
|---|---|---|---|---|
| 2012/0166869 A1* | 6/2012 | Young | ............... | G06F 11/008 714/15 |
| 2013/0067381 A1* | 3/2013 | Yalovsky | ............ | G06F 11/321 715/772 |
| 2013/0067388 A1* | 3/2013 | Celie | ............... | G06F 3/04817 715/781 |
| 2015/0005065 A1* | 1/2015 | Mizuki | ............. | A63F 13/323 463/31 |
| 2015/0169154 A1* | 6/2015 | Ainslie | ........... | G06F 17/30887 |
| 2015/0304848 A1* | 10/2015 | Kim | ................. | H04W 12/02 455/411 |
| 2016/0012221 A1* | 1/2016 | Antonelli | ........... | G06F 21/604 726/22 |
| 2016/0191534 A1* | 6/2016 | Mallozzi | ........... | G06F 21/6218 726/4 |

OTHER PUBLICATIONS

Human Factors; User interface design principles for the Telecommunications Management Network (TMN) applicable to the 'G' Interface, European Telecommunications Standards Institute (ETSI), available at https://www.etsi.org/deliver/etsi_eg/201000_201099/201024/01.01.01_50/eg_201024v010101m.pdf (1997).*

McLean et al., Monitoring and Performance in Windows 7 in Self-Paced Training Kit (Exam 70-680) Configuring Windows 7 (MCTS) Oct. 21, 2009, Pearson Education, available at https://www.microsoftpressstore.com/articles/article.aspx?p=2229240&seqNum=2 (published Oct. 21, 2009).*

Pathak, Khamosh, How to Get the Most Out of CyanogenMod's Privacy Guard Feature Sep. 28, 2015, Guiding Tech, available at http://web.archive.org/web/20150928022252/https://www.guidingtech.com/42045/cyanogenmod-privacy-guard/ (archived Sep. 28, 2015).*

Makwana, Divyang, How to check battery usage graph on Android, Mobigyann, available at https://www.mobigyaan.com/how-to-check-battery-usage-graph-on-android (Dec. 7, 2015).*

Yalburgi, Vinod, iOS 8: How to Unlock Apple's Hidden Battery Usage Menu to Check iPhone/iPad Battery Performance, International Business Times, available at https://www.ibtimes.co.uk/ios-8-how-unlock-apples-hidden-battery-usage-menu-check-iphone-ipad-battery-performance-1474382 (Nov. 12, 2014).*

* cited by examiner

MANAGING RESOURCE ACCESS

CROSS REFERENCE TO RELATED APPLICATIONS

This application claims the benefit of priority of U.S. Application Ser. No. 62/296,414, filed on Feb. 17, 2016, which is incorporated by reference herein in its entirety.

TECHNICAL FIELD

The present disclosure relates to managing resource access in a communication device.

BACKGROUND

Many communication devices, e.g., mobile devices, or other electronic devices, enable users to run applications on the communication devices. The applications may access resources of the communication devices.

DETAILED DESCRIPTION

Figure 1:
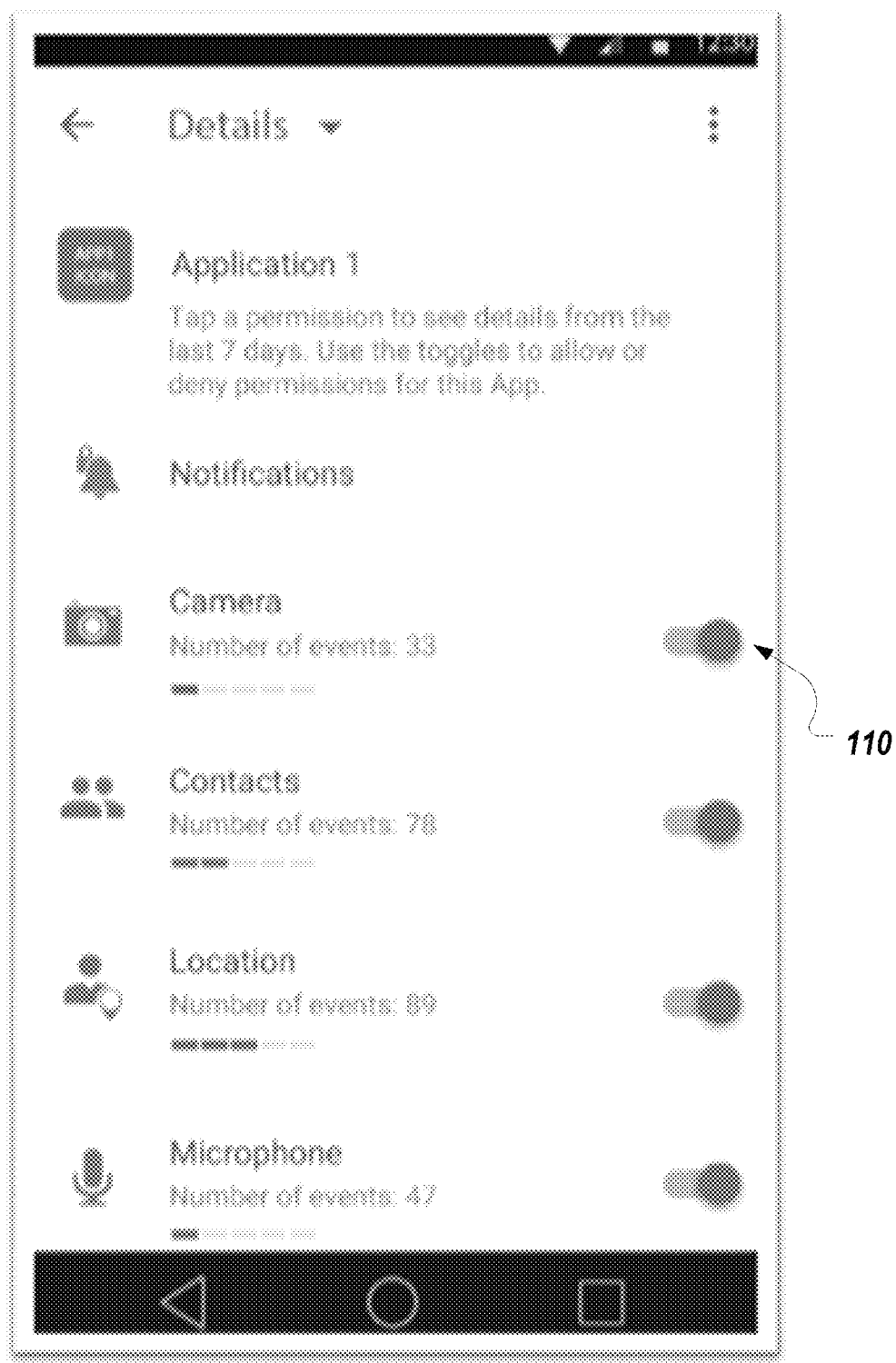
FIG. 1 is a screen shot of an example graphic user interface that outputs resource access information for one application according to an implementation.

In some cases, permissions for an application to access a resource on the communication devices can be set by a user. In some cases, a resource can include an application, set of applications, software, software modules, hardware, or combination thereof that can be configured to provide information or services. Examples of resources include a camera, a microphone, a location determination module, e.g., a Global Positioning Service (GPS) module, contact information, text or multimedia messaging module, folders and files, etc.

In some cases, a user interface can be outputted on the device for the user to set permissions for resource access associated with an application. In one example, the user can grant or deny permissions for a particular application to access different resources in one user interface.

In some cases, granting permissions may not be sufficient to provide privacy and security to a user. For example, a user may be unaware of the circumstances of resource accesses by an application that has permission. In one example, the application may turn on a microphone during a private meeting or at midnight without user knowledge. Therefore, the user may not be able to determine whether a resource access by an application is suspicious. In another example, an application may operate in the background of the operating system. A user does not know when and if an application is operating in the background of the operating system. Therefore, a user may not be aware that an application is accessing a specific resource while the application is operating in the background.

In some cases, accesses to a resource on a communication device can be monitored. For example, a resource management application on a device can monitor a number of accesses to a resource made by one or more applications over a monitoring period. In some cases, a user interface can be outputted on the device to display the information associated with one or more resource accesses by an application. In some cases, a user can further review detailed information of the resource access, e.g., the time, the duration, and the location of the device when the access is made through the same or different user interfaces.

In some cases, one user interface can be outputted to show the resource accesses information collected by the resource management application and provide a user interface object for the user to set permissions for resource access. Examples of the user interface object can include an icon, a dialogue box, or any other user interface objects that enable the user to make a selection through a user interface action. Examples of the user interface action can include tapping, swiping, clicking, touching, etc. This approach provides one or more advantages. For example, a user can both view how many times an application has accessed a particular resource and change the access permission of the particular resource by the application in the same screen. Therefore, a user can set the permission in view of the access information and make an informed selection. Both the privacy protection and the user experience can be improved. FIGS. 1-4 and associated descriptions provide additional details of these implementations.

FIG. 1 is a screen shot of an example graphic user interface 100 that outputs resource access information for one application according to an implementation. As shown in FIG. 1, the user interface 100 includes the resource access information of Application 1 with respect to different resources. In the illustrated example, the user interface 100 shows that in a particular time period, e.g., the last 7 days, Application 1 has accessed the camera resource 33 times, the contacts resource 78 times, the location resource 89 times, and the microphone resource 47 times. The user interface 100 also includes one or more user interface objects associated with each resource for Application 1. In the illustrated example, the user interface objects are toggles, e.g., toggle 110. The toggle 110 can be displayed as a circle on a bar. The toggle 110 can be tapped or otherwise actuated to change the permission setting. In one example, the circle appears on the left of the toggle 110, which indicates that the permission is off, i.e., denied. In response to receiving user input corresponding to a tap of the toggle 110, the circle can move to the right, which indicates that the permission is on, i.e., granted. In some cases, the toggle 110 can be swiped to change the permission setting. In the illustrated example, the current permission settings for the resources are shown as granted. A user can change the permission of a particular resource using the toggle 110 while viewing the number of times Application 1 has accessed the particular resource.

Figure 2:
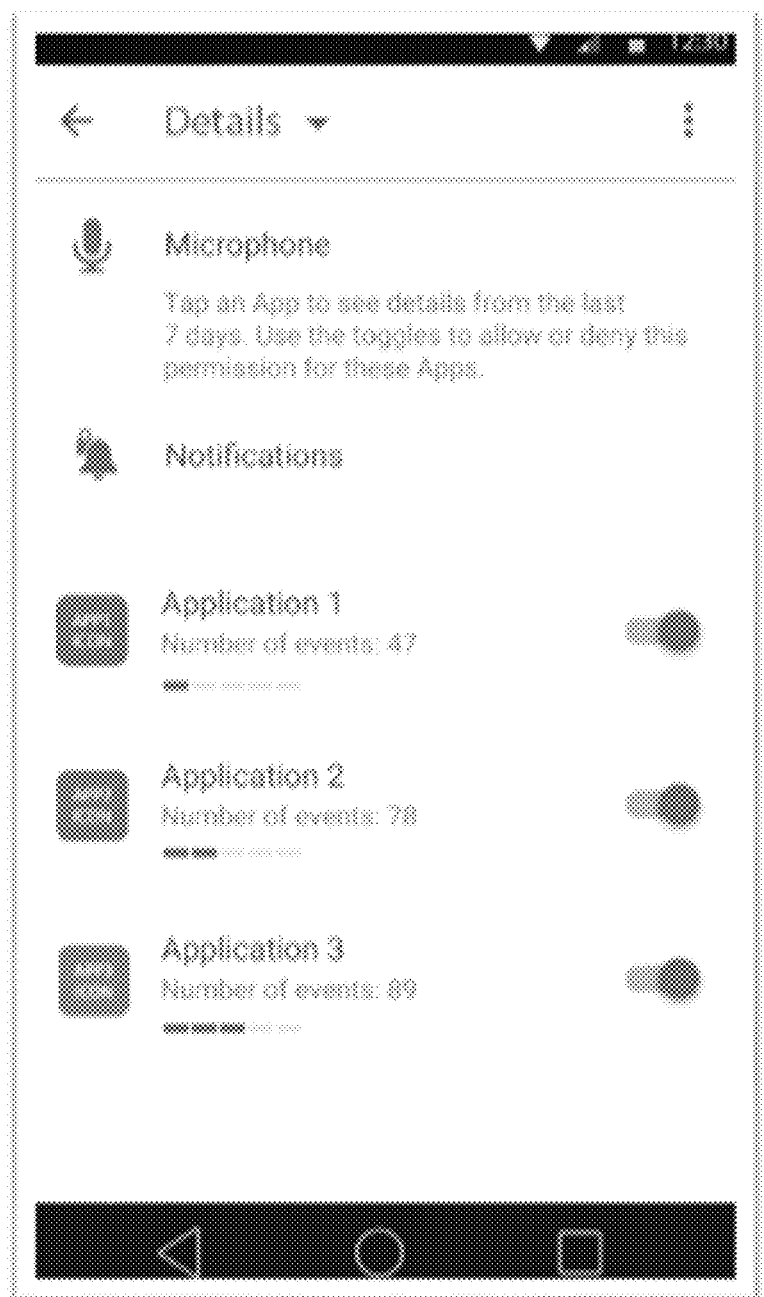
FIG. 2 is a screen shot of an example graphic user interface that outputs resource access information for a resource according to an implementation.

FIG. 2 is a screen shot of an example graphic user interface 200 that outputs resource access information for a resource according to an implementation. As shown in FIG. 2, the user interface 200 includes the resource access information of a microphone with respect to different applications. In the illustrated example, the user interface 200 shows that in a particular time period, e.g., the last 7 days, the number of times that the microphone resource has been accessed by Application 1, Application 2, and Application 3, respectively. The user interface 200 also includes user interface objects associated with each application for the microphone. In the illustrated example, the current permission setting for the camera resources are shown as granted. A user can change the permission of a particular application for the camera resource using the swipe bars while viewing the number of times the particular application has accessed the camera resource.

Figure 3:
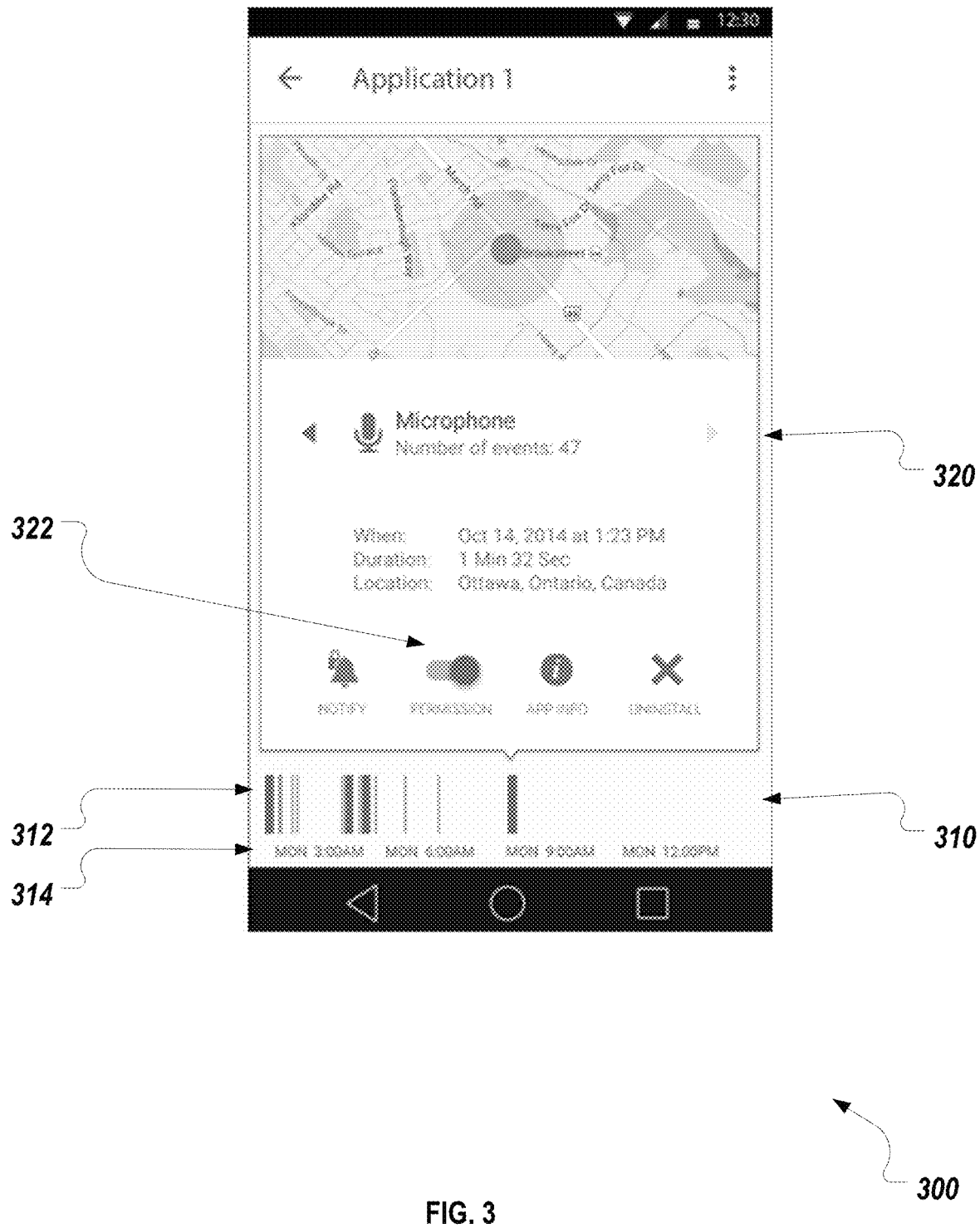
FIG. 3 is a screen shot of an example graphic user interface that outputs detailed resource access information according to an implementation.

In some cases, further details of the resource access information may be displayed or otherwise provided via the user interface shown in FIG. 1 or FIG. 2. For example, in response to receiving user input selecting the region that shows the access information of Application 1 with respect to the microphone, a user interface shows or otherwise provides how access information details can be outputted in a different user interface. The user can also control the permission in the user interface that displays the detailed access information. FIG. 3 is a screen shot of an example graphic user interface 300 that outputs detailed resource access information according to an implementation.

As shown in FIG. 3, the graphic user interface 300 may include a timeline section 310. The timeline section 310 includes a plurality of vertical bars 312, each representing a microphone access event. The timeline section 310 also includes a time scale 314 that indicates the time duration of the last 12 hours. The time scale 314 includes labels showing different times within the 24 hours, e.g., 3 AM, 6 AM, 9 AM, 12 PM, etc. As shown in FIG. 3, each vertical bar 312 that represents a microphone access event is located on a position that corresponds to the time when the access is made. This approach provides an intuitive representation of the patterns of the resource access. For example, the bars are sparsely located around 6 AM, but densely located around 9 AM, showing that the microphone was accessed rarely around 6 AM but frequently around 9 AM.

In some cases, the graphic user interface 300 can provide a zoomed view in response to user actions. For example, if a portion in the timeline section is selected via user input, the corresponding portion can be zoomed in. The selection can be made by tapping, swiping, clicking, touching, or any other user actions interacting with the user interface of the device. In one example, the user can swipe the bars located around 6 AM, and the graphic user interface 300 can present a zoomed-in view in response. The zoomed-in view can enlarge the timescale around 6 AM and therefore, show in more detail different accesses in that portion of time.

The graphic user interface 300 also includes an individual event section 320. The individual event section 320 can display detail information associated with an individual event or composite event of resource access. For example, as shown in FIG. 3, the individual event section 320 shows the name of the application (Application 1) that accessed the microphone on Oct. 14, 2014 at 1:23 PM. The individual event section 320 can include a time section that displays or otherwise indicates the event's time, duration, or a combination thereof. The individual event section 320 can also include a map section that displays or otherwise indicates the location of the communication device when the event occurred. The location may also be indicated by showing any of the following or any combination of any of the following: an address, city, state or province, zip code or postal code, country, name of a building or place, logo or icon or picture of a building or place. In the example of FIG. 3, the location of the communication device when the event occurred (Ottawa, Ontario, Canada) is shown in the map section, in addition to being outputted as text in the user interface 300.

In some cases, the graphic user interface 300 can enable the user to traverse the individual events displayed in the timeline section 310. For example, the graphic user interface can include a forward button. When the user selects the forward button, detail information associated with the next event can be displayed in the individual event section. In some cases, a user can select a bar in the timeline section 310. In response, detail information associated with the event corresponding to the selected bar can be displayed in the individual event section 320. Other user actions, e.g., scrolling or dragging, can also be used to change the event that is displayed in the individual event section.

The graphic user interface 300 also includes a user interface object 322 that enables the user to control access permission to the microphone for Application 1. In the illustrated example, the current permission setting is shown as granted. A user can change the permission using a toggle.

In some cases, the user interface discussed in FIGS. 1-3 can be invoked from the resource management application. In one example, a user can access the resource management application, select an application, and the resource access information and permission interface associated with the application, e.g., the user interface 100 shown in FIG. 1, can be outputted in the device. In another example, a user can access the resource management application, select a resource, and the resource access information and permission interface associated with the resource, e.g., the user interface shown 200 in FIG. 2, can be outputted in the device.

Alternatively or in combination, a user can access the configuration setting of the operating system on the device to trigger the user interfaces discussed in FIGS. 1-3. For example, a user can access the configuration setting interface on the device, select an application or a resource and invoke the access information and permission interface accordingly.

Figure 4:
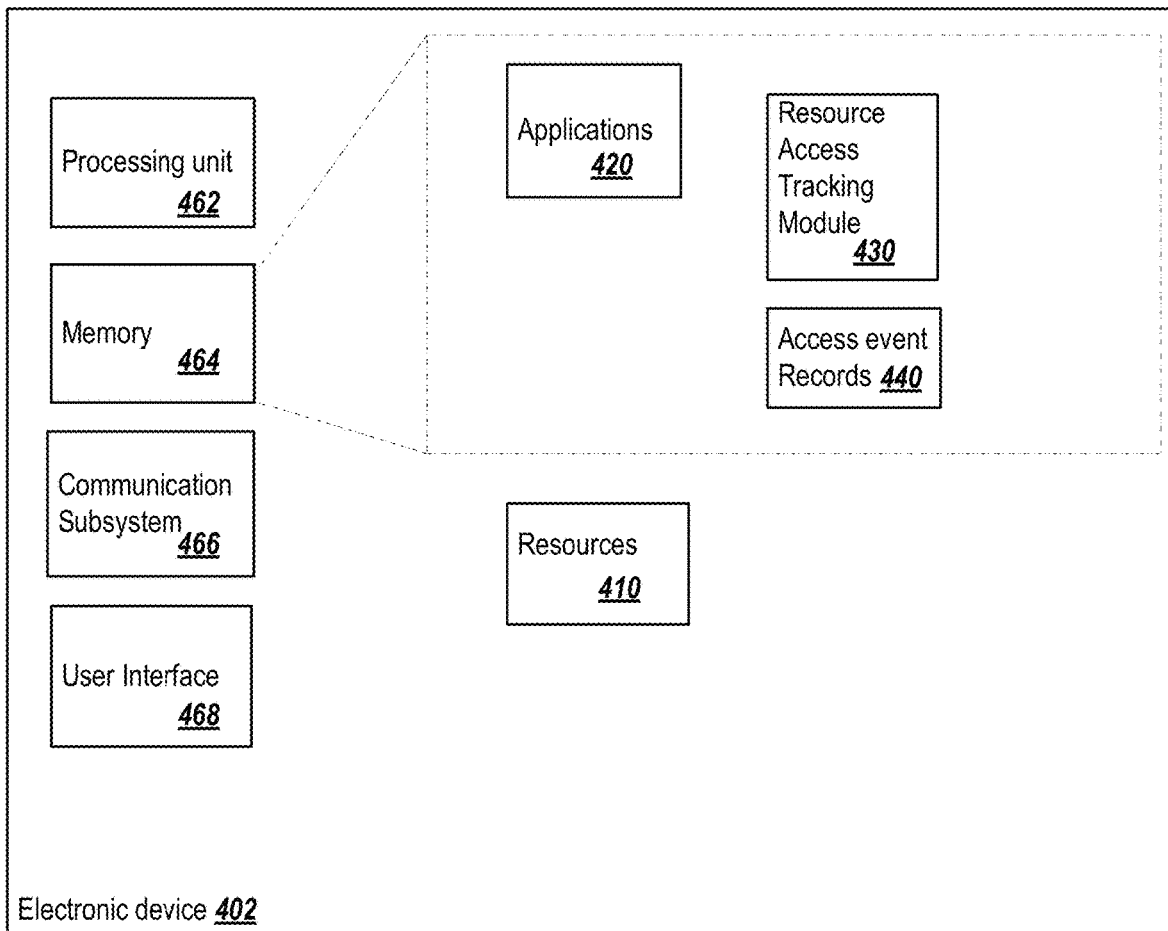
FIG. 4 is a schematic diagram showing an example electronic device that manages resource access according to an implementation.

FIG. 4 is a schematic diagram 400 showing an example electronic device 402 that manages resource access according to an implementation. The electronic device 402 includes a processing unit 462, a communication subsystem 466, a user interface 468, and a memory 464. The electronic device 402 also includes resources 410. An electronic device may include additional, different, or fewer features, as appropriate.

The example processing unit 462 can include one or more processing components (alternatively referred to as "processors" or "central processing units" (CPUs)) configured to execute instructions related to one or more of the processes, steps, or actions described above in connection with one or more of the implementations disclosed herein. In some implementations, the processing unit 462 can be configured to generate control information, such as a measurement report, or respond to received information, such as control information from a network node. The processing unit 462 can also be configured to make a radio resource management (RRM) decision such as cell selection/reselection information or trigger a measurement report. The processing unit 462 can also include other auxiliary components, such as random access memory (RAM) and read-only memory (ROM).

The example communication subsystem 466 can be configured to provide wireless or wireline communication for data or control information provided by the processing unit 462. The communication subsystem 466 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receivers in the communication subsystem 466 can be an advanced receiver or a baseline receiver. Two receivers can be implemented with identical, similar, or different receiver processing algorithms.

The example user interface 468 can include, for example, one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As discussed previously, the example user interface 468 can be configured to output a user interface that indicates resource access information for one application, e.g., user interface 100, a user interface that indicates resource access information for one resource, e.g., user interface 200, a user interface that indicates detailed resource access information such as location and timeline, e.g., user interface 300, or any other user interfaces that indicate resource access information.

The example memory 464 can be a computer-readable storage medium on the electronic device 402. Examples of the memory 464 include volatile and non-volatile memory, magnetic media, optical media, random access memory (RAM), read-only memory (ROM), removable media, and others. The memory 464 can store an operating system (OS) of the electronic device 402 and various other computer-executable software programs for performing one or more of the processes, steps, or actions described above.

The example memory 464 also includes applications 420. The applications 420 include programs, modules, scripts, processes, or other objects that can be configured to access one or more resources in the resources 410. For example, applications 420 can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the electronic device 402, one or more processes associated with an application may be stored, referenced, or executed remotely. For example, a portion of an application may be an interface to a web service that is remotely executed. Moreover, an application may be a child or sub-module of another software module (not illustrated). The applications 420 can include native applications in the operating systems, enterprise applications administrated by an employer of the user, or third-party applications downloaded by the user.

The example memory 464 also includes a resource access monitoring module 430. The resource access monitoring module 430 represents an application, set of applications, software, software modules, hardware, or any combination thereof that can be configured to detect a resource access made by an application. In some cases, when an application in the applications 420 accesses a resource in the resources 410, an event is generated. The event is reported to the resource access monitoring module 430. The resource access monitoring module 430 can determine the name of the resource, the name of the application, the time of the access, the duration of the access, the location of the access, or any other information associated with the event. In some cases, the resource access monitoring module 430 can store the information associated with the event in access event records 440. In some cases, the resource access monitoring module 430 can retrieve the resource access events during a monitoring period, compile the number of accesses made by different applications to different resources, and generate a user interface representation based on the compiled number of accesses, e.g., the graphic user interfaces 100, 200, 300 or any other user interfaces indicating resource access information.

As illustrated, the electronic device 402 also includes resources 410. The resources 410 represent an application, set of applications, software, software modules, hardware, or combination thereof that can be configured to provide information or services. The resources 410 can include folders or files that provide private information, e.g., contact, photo images, voice recordings, video recordings, emails, texts, voicemails, the camera preview buffer, and confidential files. In some cases, e.g., if a resource 410 is a folder a file, the resource 410 can be stored in the memory 464. Alternatively or additionally, the resources 410 can also include a hardware component, e.g., a microphone, a camera, or a GPS module, and its associated driver or application programming interface (API).

Turning to a general description, an electronic device, e.g., the electronic device 402, may include, without limitation, any of the following: endpoint, communication device, mobile device, mobile electronic device, computing device, user device, mobile station, subscriber station, portable electronic device, mobile communications device, wireless modem, or wireless terminal. Examples of an electronic device (e.g., the electronic device 402) may include a cellular phone, personal data assistant (PDA), smart phone, laptop, tablet personal computer (PC), pager, portable computer, portable gaming device, wearable electronic device, health/medical/fitness device, camera, vehicle, or other device having components for communicating voice or data via a wireless communication network. The wireless communication network may include a wireless link over at least one of a licensed spectrum or an unlicensed spectrum. The term "electronic device" can also refer to any hardware or software component that can terminate a communication session for a user. In addition, the terms "user equipment," "UE," "user equipment device," "user agent," "UA," "user device," and "mobile device" can be used synonymously herein.

FIG. 5 is a flowchart showing an example process 500 for managing resource access according to an implementation. The process 500 can be implemented by a communication device in a communication system. For example, the process 500 can be implemented by the electronic device 402 shown in FIG. 4 or by another type of system or module. The example process 500 shown in FIG. 5 can also be implemented using additional, fewer, or different operations, which can be performed in the order shown or in a different order.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing form the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps are not implied by the order they appear in the claims.

What is claimed is:

1. A method, comprising:
    outputting a user interface on an electronic device, wherein the user interface displays, in a same screen, duration information of a configured time period, a number of times a particular application has accessed each of a plurality of resources of the electronic device during the configured time period, and a plurality of user interface objects corresponding to the plurality of resources, and wherein for each resource of the plurality of resources, a respective user interface object of the plurality of user interface objects is displayed on the same screen for controlling a resource access permission that permits the particular application to access the respective resource of the plurality of resources;
    receiving a user input associated with one user interface object of the plurality of user interface objects;
    in response to receiving the user input, changing the respective resource access permission corresponding to the one user interface object; and
    receiving another user input that selects a particular resource of the plurality of resources on the same screen; and
    in response to the receiving the another user input that selects a particular resource of the plurality of resources on the same screen, displaying, in a second screen, a timeline section that comprises a time scale and a plurality of indications, wherein each of the plurality of indications indicates, by a position of the respective indication relative to the time scale, a time at which the particular application accessed the particular resource, and wherein the second screen further displays location information corresponding to one of the plurality of indications that is selected according to a different user input.

2. The method of claim 1, wherein the user interface displays, in the same screen, a location associated with one resource access event.

3. The method of claim 1, wherein the user interface displays, in the same screen, a timestamp associated with one resource access event.

4. The method of claim 1, wherein at least one user interface object of the plurality of user interface objects comprises a toggle.

5. A device, comprising:
    a memory; and
    at least one hardware processor communicatively coupled with the memory and configured to:
    output a user interface on an electronic device, wherein the user interface displays, in a same screen, duration information of a configured time period, a number of times a particular application has accessed each of a plurality of resources of the electronic device during the configured time period, and a plurality of user interface objects corresponding to the plurality of resources, and wherein for each resource of the plurality of resources, a respective user interface object of the plurality of user interface objects is displayed on the same screen for controlling a resource access permission that permits the particular application to access the respective resource of the plurality of resources;

receive a user input associated with one user interface object of the plurality of user interface objects;

in response to receiving the user input, change the respective resource access permission corresponding to the one user interface object; and receiving another user input that selects a particular resource of the plurality of resources on the same screen; and in response to the receiving the another user input that selects a particular resource of the plurality of resources on the same screen, display, in a second screen, a timeline section that comprises a time scale and a plurality of indications, wherein each of the plurality of indications indicates, by a position of the respective indication relative to the time scale, a time at which the particular application accessed the particular resource, and wherein the second screen further displays location information corresponding to one of the plurality of indications that is selected according to a different user input.

6. The device of claim 5, wherein the user interface displays, in the same screen, a location associated with one resource access event.

7. The device of claim 5, wherein the user interface displays, in the same screen, a timestamp associated with one resource access event.

8. The device of claim 5, wherein at least one user interface object of the plurality of user interface objects comprises a toggle.

9. A non-transitory computer-readable medium containing instructions which, when executed, cause a computing device to perform operations comprising:

outputting a user interface on the computing device, wherein the user interface displays, in a same screen, duration information of a configured time period, a number of times a particular application has accessed each of a plurality of resources of the computing device during the configured time period, and a plurality of user interface objects corresponding to the plurality of resources, and wherein for each resource of the plurality of resources, a respective user interface object of the plurality of user interface objects is displayed on the same screen for controlling a resource access permission that permits the particular application to access the respective resource of the plurality of resources;

receiving a user input associated with one user interface object of the plurality of user interface objects;

in response to receiving the user input, changing the respective resource access permission corresponding to the one user interface object; and receiving another user input that selects a particular resource of the plurality of resources on the same screen; and in response to the receiving the another user input that selects a particular resource of the plurality of resources on the same screen, displaying, in a second screen, a timeline section that comprises a time scale and a plurality of indications, wherein each of the plurality of indications indicates, by a position of the respective indication relative to the time scale, a time at which the particular application accessed the particular resource, and wherein the second screen further displays location information corresponding to one of the plurality of indications that is selected according to a different user input.

10. The non-transitory computer-readable medium of claim 9, wherein the user interface displays, in the same screen, a location associated with one resource access event.

11. The non-transitory computer-readable medium of claim 9, wherein the user interface displays, in the same screen, a timestamp associated with one resource access event.

* * * * *